(12) United States Patent
Das

(10) Patent No.: US 11,016,796 B2
(45) Date of Patent: May 25, 2021

(54) HYPERVISOR PROTECTION OF A CONTROLLABLE DEVICE

(71) Applicant: Red Hat, Inc., Raleigh, NC (US)

(72) Inventor: Bandan Das, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/379,868

(22) Filed: Apr. 10, 2019

(65) Prior Publication Data
US 2020/0326962 A1    Oct. 15, 2020

(51) Int. Cl.
*G06F 9/455*     (2018.01)
*G06F 13/42*     (2006.01)

(52) U.S. Cl.
CPC ...... *G06F 9/45558* (2013.01); *G06F 13/4282* (2013.01); *G06F 2009/45579* (2013.01); *G06F 2009/45587* (2013.01); *G06F 2009/45595* (2013.01)

(58) Field of Classification Search
CPC .......... G06F 13/00; G06F 21/52; G06F 21/53; G06F 21/56; G06F 21/566; G06F 21/568; G06F 21/6218; G06F 2221/2149; G06F 9/455; G06F 9/4558; G06F 13/42; G06F 13/4282; G06F 2009/45595; G06F 2009/45579; G06F 2009/4587; H04L 29/06; H04L 29/08072; H04L 41/12; H04L 41/22; H04L 41/0213; H04L 63/08; H04L 63/10; H04L 63/20; H04L 63/102; H04L 63/0428; H04L 63/1416
USPC .............................................. 709/223; 726/3
See application file for complete search history.

(56) References Cited

U.S. PATENT DOCUMENTS

| | | | |
|---|---|---|---|
| 5,659,756 A * | 8/1997 | Hefferon | G06F 9/468 710/200 |
| 8,613,070 B1 | 12/2013 | Borzycki et al. | |
| 8,725,916 B2 * | 5/2014 | Bhesania | G06F 9/4411 710/62 |
| 9,286,091 B2 * | 3/2016 | Adachi | G06F 9/45533 |

(Continued)

FOREIGN PATENT DOCUMENTS

KR    101772314 B1    9/2017

OTHER PUBLICATIONS

Abhishek Godara et al. "Implementation of I2C-DMA & SPI-DMA Interface: A Comparative Study", pp. 126-131; Published Date: Jun. 2014.*

(Continued)

*Primary Examiner* — Robert B Harrell
(74) *Attorney, Agent, or Firm* — Withrow & Terranova, PLLC

(57) ABSTRACT

A controller sandbox using an emulation framework of a hypervisor is disclosed. A hypervisor receives, from a task in a virtual machine that is controlled by the hypervisor in a computing device on which the hypervisor executes, a first implement device command request that requests that a first device command be implemented on a controllable device communicatively connected to the computing device via an interface. The hypervisor determines that the first device command is on an authorized device command list. Based on determining that the first device command is on the authorized device command list, the hypervisor communicates a signal to the controllable device to implement the first device command.

17 Claims, 8 Drawing Sheets

(56) References Cited

U.S. PATENT DOCUMENTS

| | | | |
|---|---|---|---|
| 9,450,960 B1* | 9/2016 | McCorkendale | H04L 63/10 |
| 9,798,561 B2* | 10/2017 | Thankappan | G06F 9/45533 |
| 10,057,264 B1 | 8/2018 | ElNakib et al. | |
| 10,235,326 B1* | 3/2019 | Panda | G06F 13/4286 |
| 10,367,811 B2* | 7/2019 | Clark | H04L 67/12 |
| 10,374,803 B2* | 8/2019 | Clark | H04L 63/0876 |
| 2009/0276774 A1* | 11/2009 | Kinoshita | G06F 21/6218 |
| | | | 718/1 |
| 2011/0061050 A1* | 3/2011 | Sahita | G06F 9/45533 |
| | | | 718/1 |
| 2012/0054486 A1* | 3/2012 | Lakkavalli | G06F 21/57 |
| | | | 713/156 |
| 2014/0337558 A1* | 11/2014 | Powers | G06F 9/45558 |
| | | | 710/313 |
| 2017/0272316 A1 | 9/2017 | Johnson et al. | |
| 2019/0109714 A1* | 4/2019 | Clark | H04L 9/3226 |
| 2020/0145217 A1* | 5/2020 | Clark | H04L 63/0227 |

OTHER PUBLICATIONS

Anand, Dylan, "Real-time Embedded Type 1 Hypervisor for IoT Device Development," iot.electronicsforu.com/news/real-time-embedded-type-1-hypervisor-for-iot-device-development/, Jul. 29, 2015, 2 pages.

Moratelli, Carlos, et al., "Embedded Virtualization for the Design of Secure IoT Applications," International Symposium on Rapid System Prototyping, Oct. 2016, Pittsburgh, Pennsylvania, IEEE, 5 pages.

Walther, Karsten, et al., "Virtualization for Manufacturing and IoT," Product Information Sheet, 2017, Harting IT Software Development GmbH & Co., 3 pages.

* cited by examiner

HYPERVISOR PROTECTION OF A CONTROLLABLE DEVICE

BACKGROUND

Many devices in homes, businesses and elsewhere, such as thermostats, appliances, switches, door locks, and the like, are increasingly capable of receiving and acting on network commands. While network control of such a device facilitates many advantages, such as control of the device from a remote location, network control also opens up a possibility of malicious remote control of the device.

SUMMARY

The examples disclosed herein utilize a hypervisor that implements a controller task for a controllable smart device in a virtual machine (VM), sometimes referred to as a sandbox. The VM only has access to controllable devices via emulation provided by the hypervisor. Thus, unless the hypervisor provides the VM an ability to communicate with a controllable device, the VM has no ability to do so. If the VM attempts to communicate with a controllable device that the VM has no access to, the attempt will result in control transferring to the hypervisor, which can then prevent such communication.

In one example a method is provided. The method includes receiving, by a hypervisor from a task in a VM that is controlled by the hypervisor in a computing device on which the hypervisor executes, a first implement device command request that requests that a first device command be implemented on a controllable device communicatively connected to the computing device via an interface. The method further includes determining, by the hypervisor, that the first device command is on an authorized device command list. The method further includes, based on determining that the first device command is on the authorized device command list, communicating, by the hypervisor via the interface, a signal to the controllable device to implement the first device command.

In another example, a computing device is provided. The computing device includes an interface configured to communicate with a controllable device communicatively connected to the computing device, and a processor device coupled to the interface. The processor device is to initiate a hypervisor and receive, by the hypervisor from a task in a VM that is controlled by the hypervisor, a first implement device command request that requests that a first device command be implemented on the controllable device. The processor device is further to determine, by the hypervisor, that the first device command is on an authorized device command list. The processor device is further to, based on determining that the first device command is on the authorized device command list, communicate, by the hypervisor via the interface, a signal to the controllable device to implement the first device command.

In another example, a computer program product is provided. The computer program product is stored on a non-transitory computer-readable storage medium and includes instructions to cause a processor device to receive, by a hypervisor from a task in a VM that is controlled by the hypervisor in a computing device on which the hypervisor executes, a first implement device command request that requests that a first device command be implemented on a controllable device communicatively connected to the computing device via an interface. The instructions further cause the processor device to determine, by the hypervisor, that the first device command is on an authorized device command list. The instructions further cause the processor device to, based on determining that the first device command is on the authorized device command list, communicate, by the hypervisor via the interface, a signal to the controllable device to implement the first device command.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
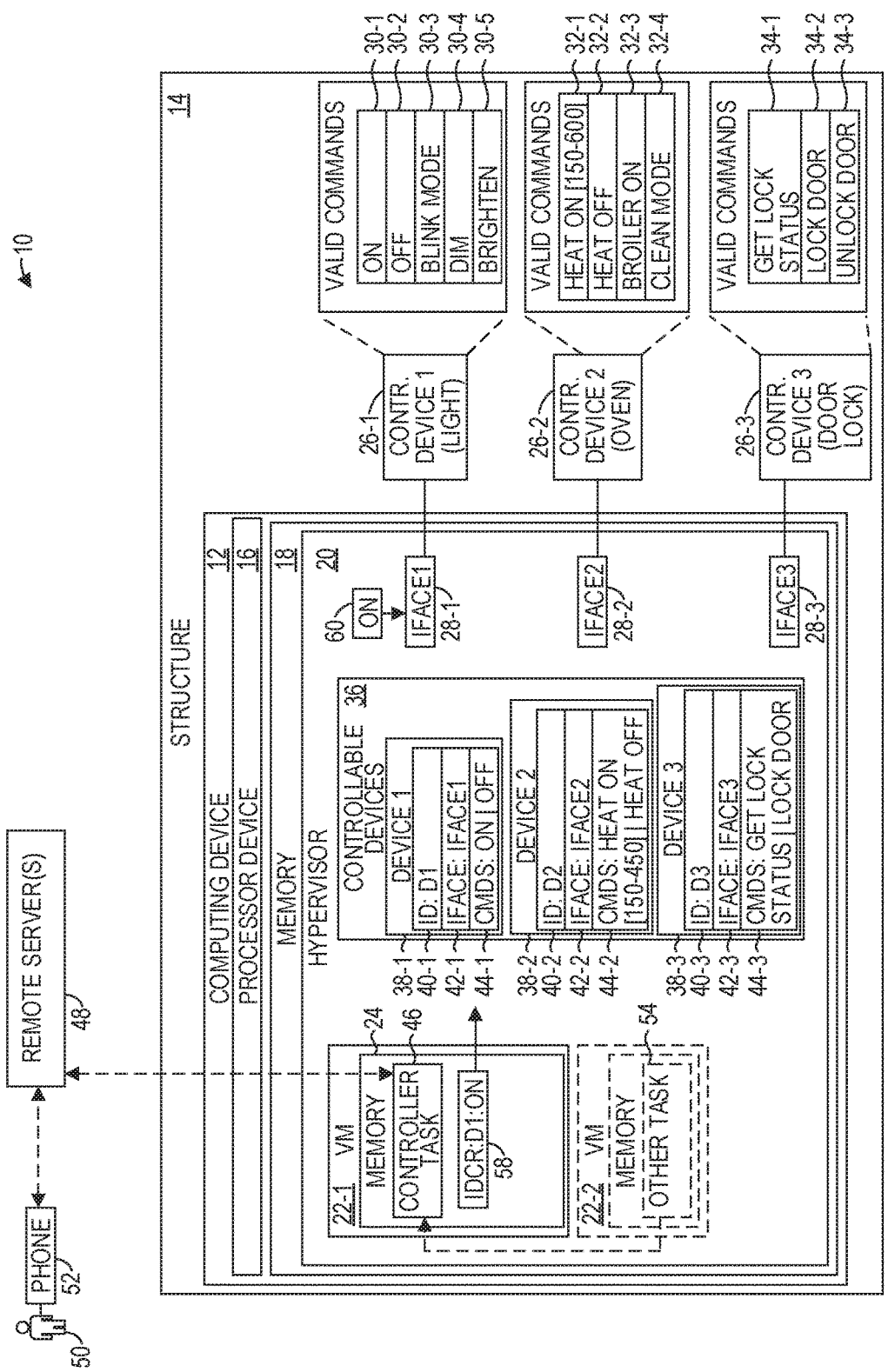
FIG. 1 is a block diagram of an environment in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Many devices in homes, businesses and elsewhere are increasingly becoming capable of receiving and acting on network commands rather than just physical buttons that exist only at the physical location of the device. While network control of such a device facilitates many advantages, such as control of the devices from a remote location, network control also opens up a possibility of malicious remote control of the device. For example, the mere fact that a "dumb" door lock requires a human to physically manipulate the door lock to unlock the door lock eliminates the ability for anyone who is not physically at the door to unlock the door lock. In contrast, a "smart" door lock that can react to remote commands allows anyone in the world to potentially manipulate the door lock.

Often such devices are controlled via a controller task running at the location of the device and that is communicatively coupled to the device. The controller task may be configured to receive commands remotely and, in response to the commands, query or alter a status of the device. As an example, a smart door lock today may be able to be accessed remotely to determine the status of the door lock (e.g., locked or unlocked), or to change the status of the door lock (e.g., lock or unlock the door lock). A malicious individual, however, may be able to determine a mechanism by which to send a command to the controller device to thereby unlock the door lock. Alternatively, a malicious individual may be able to download onto the computing device that runs the controller task a malicious controller task that can control the door lock outside of the controller task.

As manufacturers increasingly build remote command intelligence into devices that previously required physical manipulation to control, the opportunities for malicious individuals to manipulate devices in an undesirable manner increases.

The examples disclosed herein utilize a hypervisor that implements a controller task for a smart device in a virtual machine (VM), sometimes referred to as a sandbox. The VM only has access to controllable devices via emulation provided by the hypervisor. Thus, unless the hypervisor provides the VM an ability to communicate with a controllable device, the VM has no ability to do so. If the VM attempts to communicate with a controllable device that the VM has no access to, the attempt will result in control transferring to the hypervisor, which can then prevent such communication.

In particular, the examples implement an authorized device command list for a connected device that is maintained by the hypervisor. The controller task can only interact with the controllable device via the hypervisor, and the hypervisor will only implement a device command that is on the authorized device command list. If the controller task requests that the hypervisor implement a device command that is not on the authorized device command list, the hypervisor disregards the request. Even if a malicious task is downloaded to the VM, the malicious task cannot directly access the controllable device because the VM has no access to the controllable device. Thus, even the malicious task must interact with the hypervisor to control the controllable device.

FIG. 1 is a block diagram of an environment 10 in which examples may be practiced. The environment 10 includes a computing device 12 located in a structure 14, such as a home, an office building, or the like. The computing device 12 includes a processor device 16 coupled to a memory 18. The computing device 12 may comprise, by way of non-limiting example, a general purpose computing device or a single board computer such as a Raspberry Pi. The computing device 12 is configured to execute a hypervisor 20 that can implement one or more VMs 22-1-22-2 (generally, VM 22). The hypervisor 20 provides hardware emulation to the VMs 22, and each VM 22 operates as a standalone virtual computer, and shares the processor device 16 and the memory 18 of the physical computing device 12. The hypervisor 20 may be referred to as a host machine, and the VMs 22 may be referred to as guest machines. The hypervisor 20 may comprise any suitable hypervisor that implements hardware virtualization, such as the Kernel-based Virtual Machine (KVM) hypervisor.

When the hypervisor 20 initiates the VM 22-1, the hypervisor 20 provides the VM 22-1 a memory 24. The memory 24 is a portion of the memory 18 and, as far as the VM 22-1 is aware, the memory 24 is all the memory that exists on the computing device 12. The actual memory addresses given to the VM 22-1 may be virtual addresses and not physical memory addresses. If the VM 22-1, or any task executing in the VM 22-1, attempts to perform an operation on a portion of the memory 18 that the VM 22-1 does not have access to, the hypervisor 20 will be invoked, and will prohibit such operation.

The hypervisor 20 may also, as needed, provide virtualized hardware devices to the VM 22-1, such as a virtual ethernet transceiver for wireless or wired access with devices communicatively coupled to the computing device 12. Similarly, access of such a virtual ethernet transceiver is controlled and can be monitored by the hypervisor 20. If a device is connected to the computing device 12 but the hypervisor 20 has not given the VM 22-1 access to the device, the VM 22-1 cannot communicate with the device. Attempts to do so (such as, for example, by a malicious task executing in the VM 22-1) will result in control transferring to the hypervisor 20, and the hypervisor 20 can then take any desirable action, such as inhibiting such access, or the like. Because the VM 22-1 (and any tasks executing in the VM 22-1) can only access the memory and devices to which the hypervisor 20 has provided access, the VM 22-1 is sometimes referred to as a sandbox, and tasks executing in the VM 22-1 may be referred to as tasks executing in a sandbox. The limitations described herein with respect to the VM 22-1 applies equally to any tasks that execute in the VM 22-1 because any such operations by any such task necessarily invoke the VM 22-1.

It should be noted that, because the hypervisor 20 is a component of the computing device 12, functionality implemented by the hypervisor 20 may be described herein as being implemented by the computing device 12. Moreover, in examples where the hypervisor 20 comprises software instructions that are implemented via the processor device 16, functionality implemented by the hypervisor 20 may also be described herein as being implemented by the processor device 16.

The computing device 12 is communicatively coupled to a plurality of controllable devices 26-1-26-3 (generally, controllable devices 26). Each controllable device 26-1-26-3 is communicated with via a corresponding interface ("IFACE") 28-1-28-3 controlled by the hypervisor 20. The hypervisor 20 does not provide access to the interfaces 28-1-28-3 to the VM 22-1, and thus the VM 22-1 cannot directly communicate with any controllable device 26, and any attempt to do so will cause control to transfer to the hypervisor 20.

The interfaces 28-1-28-3 may comprise a combination of software and hardware. For example, the interface 28-1 may comprise a wireless transceiver and an application programming interface (API) that can be invoked by the hypervisor 20 to send read and write operations through the wireless transceiver to the controllable device 26-1. Alternatively, the interface 28-1 may be a serial interface, such as an I2C or Serial Peripheral Interface (SPI) interface, and the controllable device 26-1 may utilize a serial protocol for communications. The interfaces 28-1-28-3 may all be the same type of interface or any combination of interfaces. For purposes of illustration, the controllable devices 26-1-26-3 are identified in terms of the product in which they are implemented; however, at a hardware level such functionality may be implemented by one or more components of the product, such as, by way of non-limiting example, a sensor configured to sense an attribute of the environment, an actuator, a servo motor, an amplifier, or any combination thereof.

Functionality implementable by a controllable device 26 may be implemented via different components that utilize different interfaces. For example, the controllable device 26-3 may utilize an infrared (IR) proximity sensor that utilizes an I2C interface to determine whether the door lock is in a locked position or an unlocked position, and an actuator that utilizes an SPI interface to lock the door lock or unlock the door lock. As another example, the controllable device 26-3 may comprise a servo motor connected via General Purpose Input Output (GPIO) pins to, for example, a Raspberry Pi, to lock or unlock the door.

The controllable device 26-1 is configured to implement a plurality of device commands 30-1-30-5. In this example, the controllable device 26-1 is a smart light, and can implement an ON command 30-1 that, when received, causes the light to turn on, an OFF command 30-2 that, when received, causes the light to turn off, a BLINK MODE command 30-3 that, when received, causes the light to blink, a DIM command 30-4 that, when received, causes the light to dim, and a BRIGHTEN command 30-5 that, when received, causes the light to brighten.

The controllable device 26-2 is configured to implement a plurality of device commands 32-1-32-4. In this example, the controllable device 26-2 is an oven, and can implement a HEAT ON command 32-1 that, when received, causes the oven to heat to a designated temperature between 150 and 600 degrees, a HEAT OFF command 32-2 that, when received, causes the oven to turn off, a BROILER ON command 32-3 that, when received, causes the broiler to turn on, and a CLEAN MODE command 32-4 that, when received, causes the oven to enter a cleaning mode.

The controllable device 26-3 is configured to implement a plurality of device commands 34-1-34-3. In this example, the controllable device 26-3 is a door lock, and can implement a GET LOCK STATUS command 34-1 that, when received, causes the door lock to return the status of the door lock (e.g., locked or unlocked), a LOCK DOOR command 34-2 that, when received, causes the door lock to be locked, and an UNLOCK DOOR command 34-3 that, when received, causes the door lock to be unlocked.

The hypervisor 20 maintains a controllable devices structure 36 that contains an entry 38-1-38-3 for each of the controllable devices 26-1-26-3, respectively. The controllable devices structure 36 may, for example, be generated by a user and stored in a configuration file accessible to the hypervisor 20, or may be generated in any other suitable or desirable manner. The entry 38-1 corresponds to the controllable device 26-1 and contains a device identifier (ID) 40-1 ("D1"), an interface ID 42-1 ("IFACE1"), and an authorized device command list 44-1 that contains a list of device commands that are authorized to be sent to the controllable device 26-1 from a task executing in the VM 22-1 (via the hypervisor 20, as will be discussed in greater detail below). Note that the authorized device command list 44-1 identifies the device commands 30-1 and 30-2 as authorized device commands, but does not identify the device commands 30-3-30-5 as authorized device commands. Thus, the device commands 30 identified on the authorized device command list 44-1 is a proper subset of the plurality of device commands 30-1-30-5.

The entry 38-2 corresponds to the controllable device 26-2 and contains a device identifier (ID) 40-2 ("D2"), an interface ID 42-2 ("IFACE2"), and an authorized device command list 44-2 that contains a list of device commands that are authorized to be sent to the controllable device 26-2 from a task executing in the VM 22-1. Note that the authorized device command list 44-2 identifies the device commands 32-1 and 32-2 as authorized device commands, but does not identify the device commands 32-3-32-4 as authorized device commands. Moreover, the authorized device command list 44-2 limits the range of temperatures that can be designated in conjunction with the device command "HEAT ON" to a range between 150 degrees and 450 degrees. Thus, the device commands 32 identified on the authorized device command list 44-2 is a proper subset of the plurality of device commands 32-1-32-4.

The entry 38-3 corresponds to the controllable device 26-3 and contains a device identifier (ID) 40-3 ("D3"), an interface ID 42-3 ("IFACE3"), and an authorized device command list 44-3 that contains a list of device commands that are authorized to be sent to the controllable device 26-3 from a task executing in the VM 22-1. Note that the authorized device command list 44-3 identifies the device commands 34-1 and 34-2 as authorized device commands, but does not identify the device command 34-3 as an authorized device command. Thus, the device commands 34 identified on the authorized device command list 44-3 is a proper subset of the plurality of device commands 34-1-34-3.

A controller task 46 is initiated in the VM 22-1. The controller task 46 is configured to receive a message from a task external to the VM 22-1 that requests that a respective controllable device 26-1-26-3 implement a device command on the respective controllable device 26-1-26-3. In some examples, the controller task 46 may perform a process that identifies the controller task 46 as the control mechanism by which another task may request that a device command be implemented on any of the controllable devices 26-1-26-3. The process for presenting itself as the control mechanism to communicate with the controllable devices 26-1-26-3 may differ depending on the underlying architecture used to remotely communicate with the controllable devices 26-1-26-3. For example, in a server-based system that includes a remote server 48 (e.g., a cloud-based service), the controller task 46 may perform a registration process to register the controller task 46 (such as via IP address, domain name, or some other suitable identifier) as the destination for any commands directed to any of the controllable devices 26-1-26-3. Thus, in this example, a user 50 using a smart phone 52 may wish to unlock the controllable device 26-3. The user 50 may initiate an application on the smart phone 52 for this purpose, and select an "UNLOCK" option. The smart phone 52 sends an "UNLOCK" request with suitable identification and authentication information to the remote server 48. Due to previous registration by the controller task 46, the remote server 48 determines that the controller task 46 is the appropriate destination for the "UNLOCK" request and sends the "UNLOCK" request to the controller task 46.

In other examples, the controller task 46 need not perform any such identification process, and external tasks determine that the controller task 46 is the control mechanism for communicating with the controllable devices 26-1-26-3 via configuration information, by hard-coding an address of the controller task 46 in the external task, or via any other suitable mechanism by which the controller task 46 may be identified and/or discovered. As an example, a task 54 executing in the VM 22-2 in the computing device 12 may be programmed to send any such commands to the controller task 46. For example, the task 54 may offer a user interface that allows the user 50 to request that the controllable device 26-3 be unlocked. Upon receipt of such request, the task 54 may communicate such request to the controller task 46. In yet other examples, the controller task 46 may offer a user interface to the user 50 to allow the user 50 to issue commands/requests to the controllable devices 26-1-26-3.

Assume that the controller task 46, in response to a message from a task external to the VM 22-1, such as the smart phone 52 or the task 54, wishes to implement the device command 30-1 on the controllable device 26-1. Because the controller task 46 cannot directly communicate with the controllable device 26-1, the controller task 46 communicates to the hypervisor 20 an implement device command request 58 that requests that the device command 30-1 be implemented on the controllable device 26-1. Mechanisms for facilitating communications between the controller task 46 and the hypervisor 20 will be discussed in greater detail below. The hypervisor 20 receives the implement device command request 58, and accesses the entry 38-1 that corresponds to the controllable device 26-1. The hypervisor 20 accesses the authorized device command list 44-1 and determines that the device command 30-1 is on the authorized device command list 44-1. Based on determining that the device command 30-1 is on the authorized device command list 44-1, the hypervisor 20 may communicate a signal 60 to the controllable device 26-1 via the interface 28-1 to implement the device command 30-1. The hypervisor 20 may also receive an indication from the controllable device 26-1 that the device command 30-1 was successfully implemented. The hypervisor 20 may communicate this confirmation to the controller task 46, which, in turn, may communicate confirmation to the external task that requested that the device command 30-1 be implemented on the controllable device 26-1.

Note that if the controller task 46 issued an implement device command request to implement the device commands 30-3, 30-4, or 30-5 on the controllable device 26-1, the hypervisor 20 would determine that the device commands 30-3, 30-4, or 30-5 are not on the authorized device command list 44-1, and would disregard the implement device command request. The term "disregard" in this context means that the hypervisor 20 would not implement the requested device command, although the hypervisor 20 may take some other action, such as terminating the controller task 46, the VM 22-1, and/or sending a warning or other alert to an operator or other user, for example.

Note also that if the controller task 46 attempted to bypass the hypervisor 20 and communicate directly with the interface 28-1, control would automatically transfer to the hypervisor 20 because the VM 22-1 has no access to the interface 28-1. Thus, there is no mechanism by which the controller task 46 can implement the device commands 30-3-30-5 on the controllable device 26-1.

Figure 2:
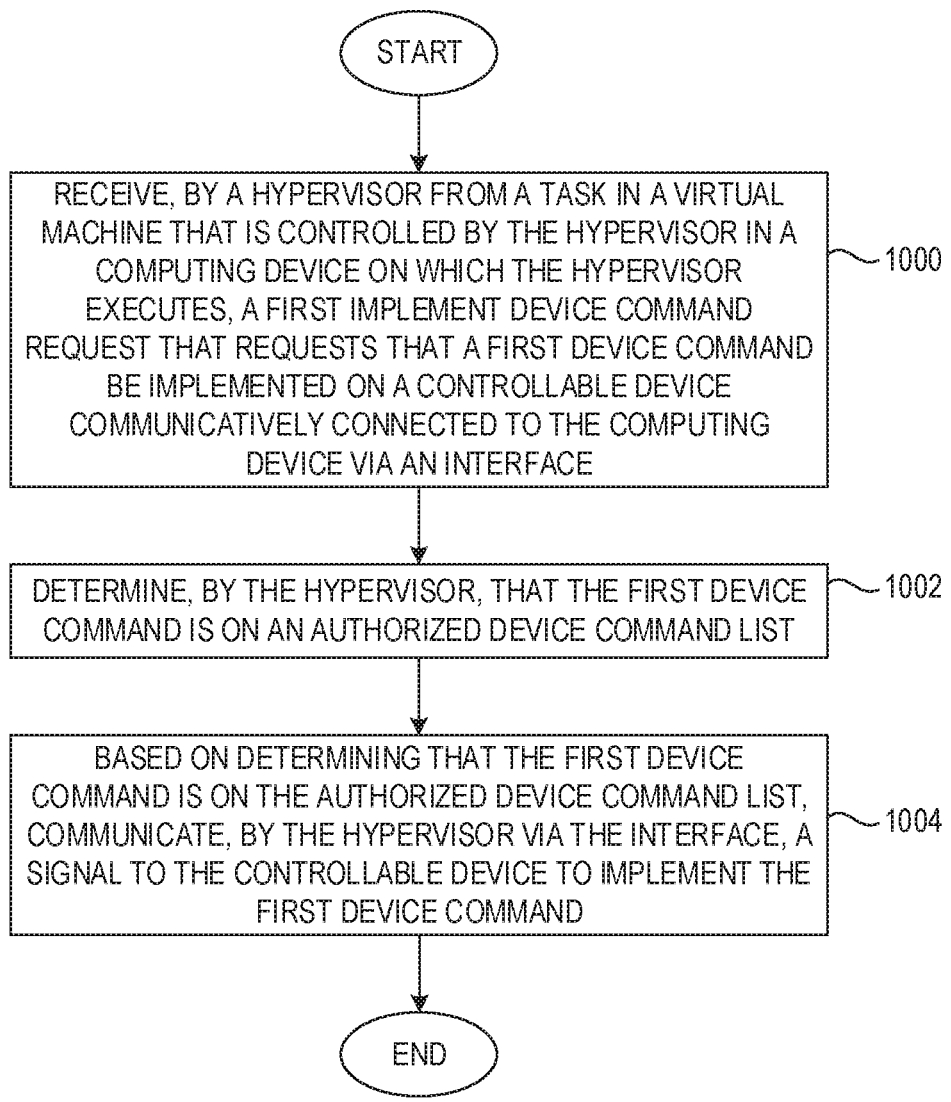
FIG. 2 is a flowchart of a method for implementing a controller sandbox using an emulation framework of a hypervisor according to one example.

FIG. 2 is a flowchart of a method for implementing a controller sandbox using an emulation framework of a hypervisor according to one example. FIG. 2 will be discussed in conjunction with FIG. 1.

The hypervisor 20 receives from the controller task 46 in the VM 22-1, which is controlled by the hypervisor 20, the implement device command request 58 that requests that the device command 30-1 be implemented on the controllable device 26-1 communicatively connected to the computing device 12 via the interface 28-1 (FIG. 2, block 1000). The hypervisor 20 determines that the device command 30-1 is on the authorized device command list 44-1 (FIG. 2, block 1002). Based on determining that the device command 30-1 is on the authorized device command list 44-1, the hypervisor 20 communicates the signal 60 to the controllable device 26-1 to implement the device command 30-1 (FIG. 2, block 1004).

Figure 3:
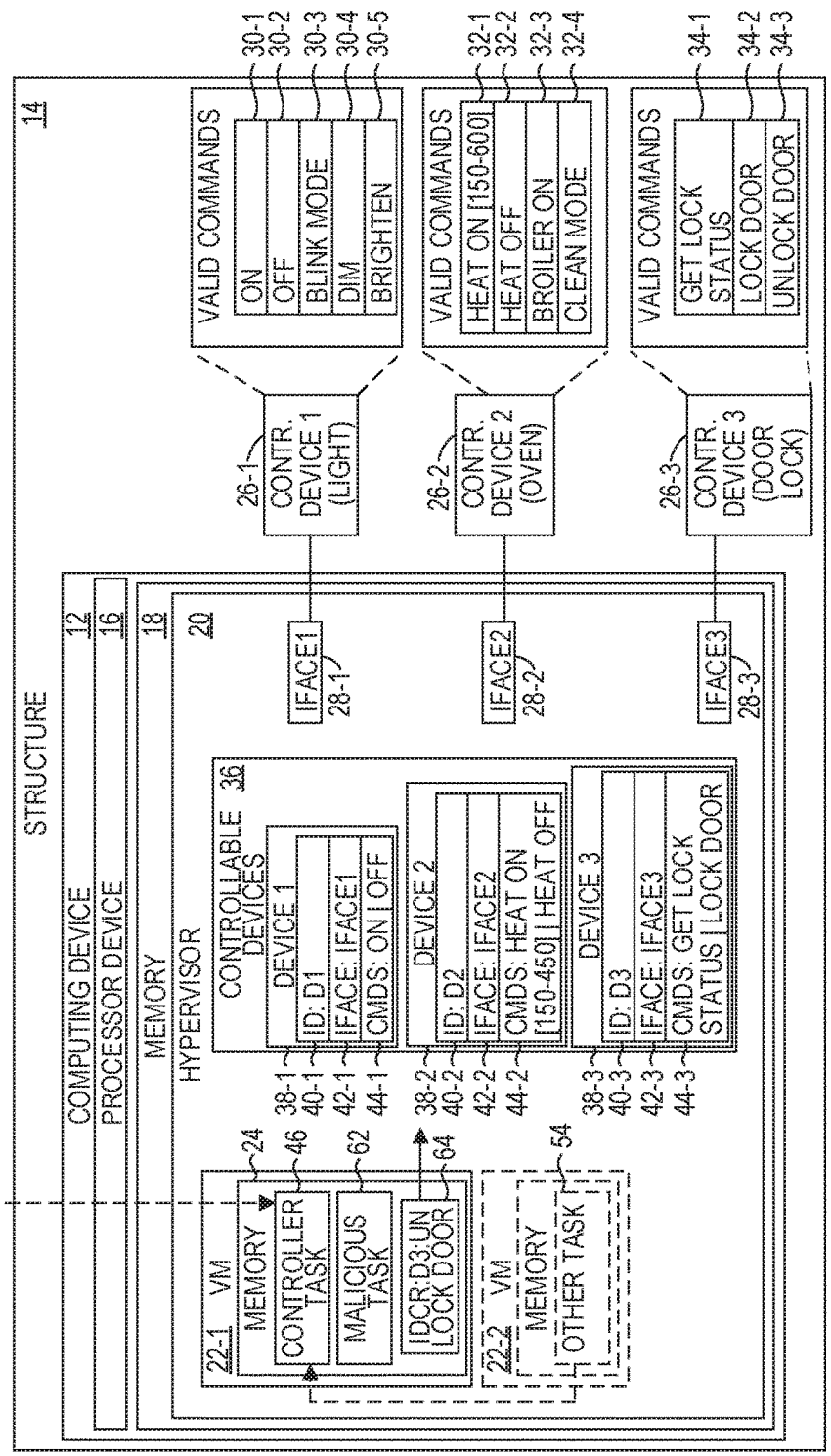
FIG. 3 is a block diagram of the environment illustrated in FIG. 1 in which additional examples may be practiced.

FIG. 3 is a block diagram of the environment 10 in which additional examples may be practiced. In this example, a malicious task 62 has been initiated in the VM 22-1. The malicious task 62 is programmed to understand the communications protocol between the controller task 46 and the hypervisor 20 (as described in greater detail below) and thus "spoofs" the controller task 46. The malicious task 62 communicates to the hypervisor 20 an implement device command request 64 that requests that the device command 34-3 (UNLOCK DOOR) on the controllable device 26-3. The hypervisor 20 receives the implement device command request 64 from the malicious task 62 and accesses the authorized device command list 44-3 that corresponds to the controllable device 26-3. The hypervisor 20 determines that the device command 34-3 is not identified on the authorized device command list 44-3. In response to determining that the device command 34-3 is not identified on the authorized device command list 44-3, the hypervisor 20 disregards the implement device command request 64 and does not send a signal to the controllable device 26-3.

Figure 4:
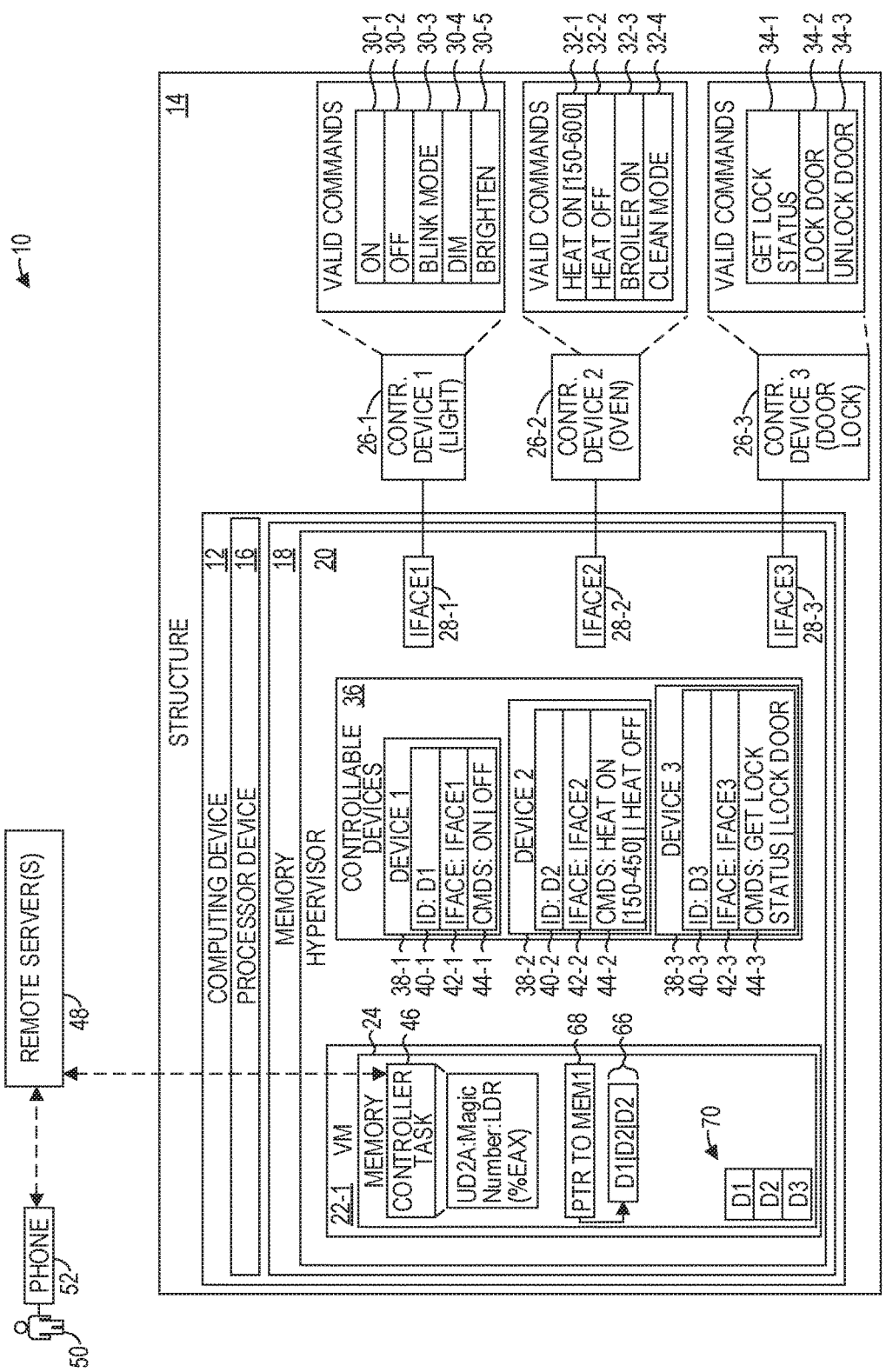
FIG. 4 is a block diagram of the environment illustrated in FIG. 1 that illustrates one mechanism for communications between a controller task and a hypervisor according to one example.

FIG. 4 is a block diagram of the environment 10 that illustrates one mechanism for communications between the controller task 46 and the hypervisor 20 according to one example. In this example, the controller task 46 wishes to obtain a list of the controllable devices 26-1-26-3 from the hypervisor 20, and thus prepares to communicate a list device request to the hypervisor 20. In this example, by convention, the controller task 46 first allocates a memory portion 66 to hold the list of controllable devices 26-1-26-3 provided by the hypervisor 20 in response to the list device request from the controller task 46. The controller task 46 then inserts a pointer 68 in a machine register, such as, by way of non-limiting example, an EAX machine register, that points to the memory portion 66. The controller task 46 then communicates a list device request to the hypervisor 20. While the controller task 46 may communicate with the hypervisor 20 in any suitable manner, in one example, the controller task 46 may execute the following instruction string "UD2A:.ascii MagicNumber:LDR(% EAX)", wherein "UD2A" is an undefined instruction on an Intel microprocessor that will cause a virtual machine exit, wherein "MagicNumber" is a predetermined value (e.g., 0x107DEB1C) known to the hypervisor 20 and the controller task 46 as being an identifier of the controller task 46, and wherein "LDR(% EAX)" is a List Device Request followed by the location of a pointer to memory where the hypervisor 20 should store the list of the controllable devices 26-1-26-3.

Upon execution by the controller task 46 of the instruction string above, and because the UD2A opcode is an invalid opcode, control transfers immediately from the controller task 46 and the VM 22-1 to the hypervisor 20. The hypervisor 20 determines that an invalid opcode was encountered and examines the instruction string being executed. The hypervisor 20 identifies the MagicNumber and determines based on the MagicNumber that the controller task 46 attempted to execute the invalid opcode UD2A, and thus that this is a communication from the controller task 46. The hypervisor 20 then accesses the instruction "LDR(% EAX)" and determines that the characters LDR correspond to a list device request, and that the pointer 68 is in the EAX machine register. The hypervisor 20, using the pointer 68, copies to the memory portion 66 the device IDs 40-1, 40-2, and 40-3 of the controllable devices 26-1-26-3. It will be apparent that the hypervisor 20 could also provide any additional suitable information, such as a type of controllable device 26, or the like, in response to the list device request. The hypervisor 20 then returns control to the controller task 46. The controller task 46 may access the memory portion 66 and generate a controllable device structure 70 that contains the device IDs 40-1, 40-2, and 40-3 of the controllable devices 26-1-26-3.

It will be apparent that the controller task 46 may utilize this mechanism for communicating any desirable commands to the hypervisor 20, such as a list device command request (LDCR) that requests a list of authorized device commands for a particular controllable device 26-1-26-3, or an implement device command request (IDCR) that requests that a particular device command be implemented on a particular controllable device 26-1-26-3.

Although FIG. 4 illustrates one mechanism for obtaining the list of controllable devices 26-1-26-3 from the hypervisor 20, the disclosed examples are not limited to any particular mechanism, and in other examples, the controller task 46 may obtain the list of controllable devices 26-1-26-3 by, for example, accessing a configuration file, via runtime parameters passed into the controller task 46 at runtime, via hardcoding such information into the controller task 46, or the like.

Figure 5:
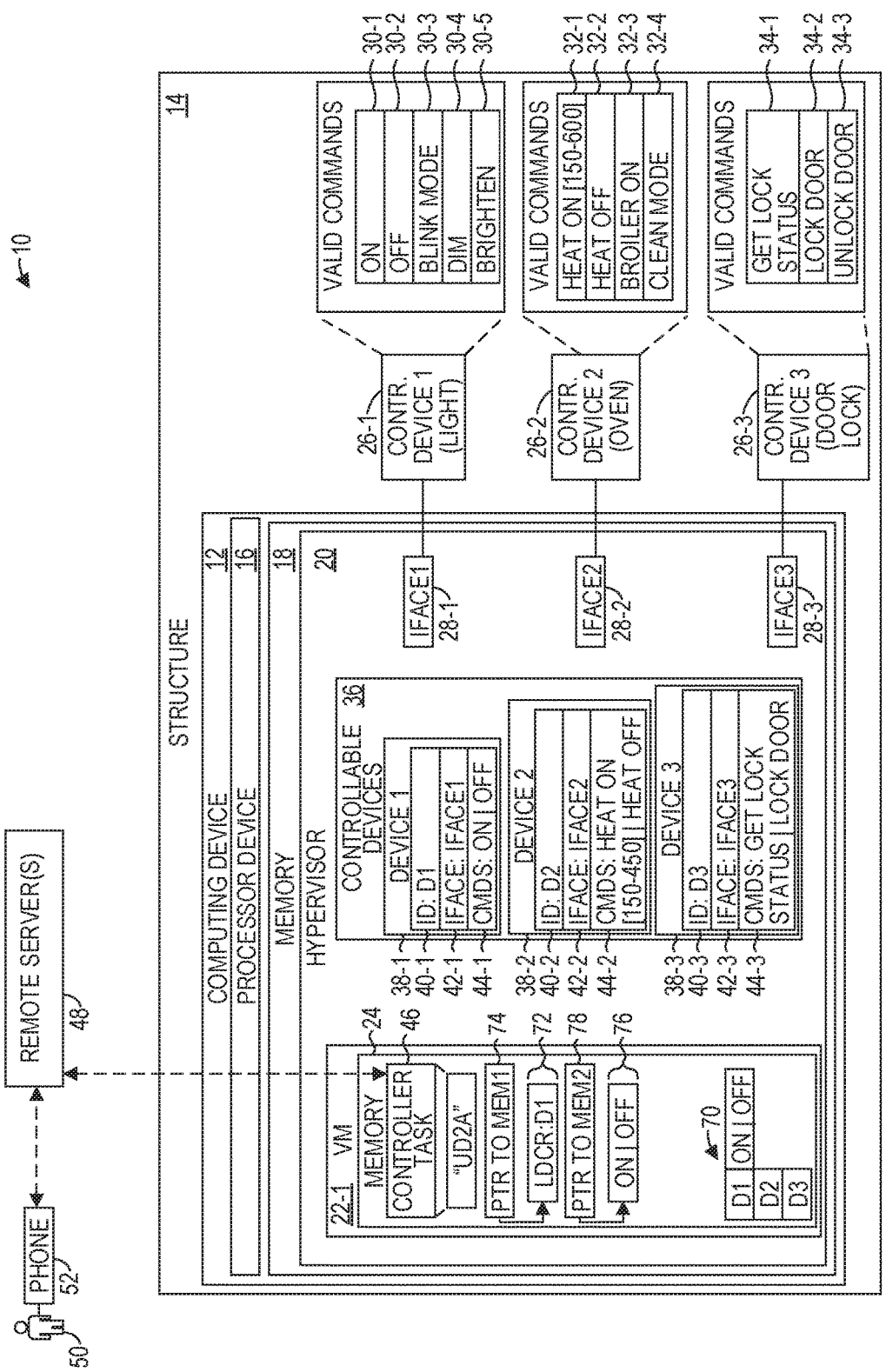
FIG. 5 is a block diagram of the environment illustrated in FIG. 1 that illustrates another mechanism for communications between the controller task and the hypervisor according to one example.

FIG. 5 is a block diagram of the environment 10 that illustrates another mechanism for communications between the controller task 46 and the hypervisor 20 according to one example. In this example, the controller task 46 wishes to obtain a list of the authorized commands for the controllable device 26-1 from the hypervisor 20, and thus prepares to communicate a list device command request (LDCR) to the hypervisor 20. In this example, by convention, the controller task 46 first allocates a memory portion 72 to hold the list device command request and inserts the characters LDCR: D1 in the memory portion 72. The controller task 46 then inserts a pointer 74 in a first machine register, such as, by way of non-limiting example, an EAX machine register, that points to the memory portion 72. The controller task 46 then allocates a memory portion 76 to hold the list of authorized device commands for the controllable device 26-1 provided by the hypervisor 20 in response to the list device command request from the controller task 46. The controller task 46 then inserts a pointer 78 in a second machine register that points to the memory portion 76.

The controller task 46 then executes the opcode instruction of "UD2A". Because the UD2A opcode is an invalid opcode, control transfers immediately from the controller task 46 and the VM 22-1 to the hypervisor 20. The hypervisor 20 determines that the controller task 46 attempted to execute the invalid opcode UD2A thereby causing control to transfer from the VM 22-1 to the hypervisor 20. By convention, the hypervisor 20 accesses the pointer 74, and via the pointer 74 accesses the memory portion 72. The hypervisor 20 determines that the memory portion 72 contains a list device command request that requests a list of authorized device commands for the controllable device 26-1. The hypervisor 20 accesses the authorized device command list 44-1 that contains the list of device commands that are authorized to be sent to the controllable device 26-1. The hypervisor 20 then, by convention, accesses the pointer 78 in the second machine register and copies to the memory portion 76 the device commands 30-1 and 30-2 identified in the authorized device command list 44-1. The hypervisor 20 then returns control to the controller task 46. The controller task 46 may access the memory portion 76 and update the controllable device structure 70 to identify the authorized device commands 30-1 and 30-2.

As an alternative communication mechanism, similar to that discussed above with regard to FIG. 4, in place of inserting a device command 30 in a portion of memory, the controller task 46 may execute an instruction string that contains the device command 30. In this example, the controller task 46 may execute the instruction string "UD2A:.ascii MagicNumberLDCR(% EAX):D1". Upon execution by the controller task 46 of the instruction string above, and because the UD2A opcode is an invalid opcode, control transfers immediately from the controller task 46 and the VM 22-1 to the hypervisor 20. The hypervisor 20 determines that an invalid opcode was encountered and examines the instruction string being executed. The hypervisor 20 identifies the MagicNumber and determines based on the MagicNumber that the controller task 46 attempted to execute the invalid opcode UD2A, and thus that this is a communication from the controller task 46. The hypervisor 20 then accesses the instruction "LDCR(% EAX):D1" and determines that this is a list device command request that requests that a list of authorized device commands for the controllable device 26-1 be copied to the pointer contained in the EAX machine register. The hypervisor 20 accesses the authorized device command list 44-1 that contains the list of device commands that are authorized to be sent to the controllable device 26-1. The hypervisor 20 then accesses the pointer in the EAX machine register and copies to the memory pointed to by the pointer in the EAX machine register the device commands 30-1 and 30-2 identified in the authorized device command list 44-1. The hypervisor 20 then returns control to the controller task 46.

Figure 6:
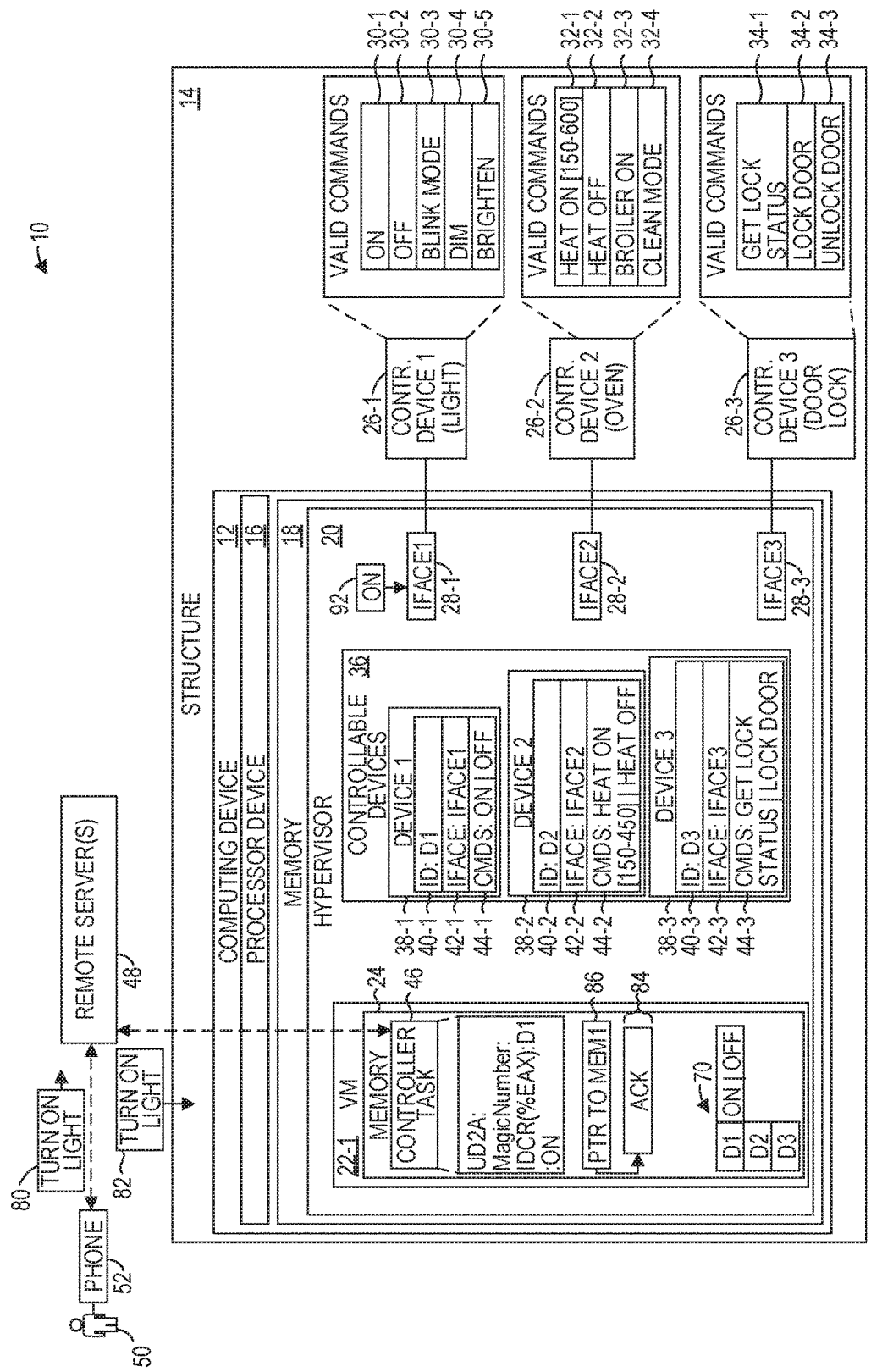
FIG. 6 is a block diagram of the environment illustrated in FIG. 1 that illustrates another mechanism for communications between the controller task and the hypervisor according to one example.

FIG. 6 is a block diagram of the environment 10 that illustrates another mechanism for communications between the controller task 46 and the hypervisor 20 according to one example. In this example, the controller task 46 registers with the remote server 48 as the control task for communicating with the controllable device 26-1. The controller task 46, in this example, may utilize a Message Queuing Telemetry Transport (MQTT) protocol to communicate with the remote server 48. The controller task 46 subscribes with remote server 48 to receive any messages directed toward the controllable device 26-1.

The user 50 accesses the smart phone 52 and sends a message 80 to the remote server 48 that requests that the controllable device 26-1 (i.e., a light) be turned on. The remote server 48 determines that the controller task 46 has subscribed to receive messages directed toward the controllable device 26-1, and sends a message 82 to the controller task 46 that requests that the controllable device 26-1 be turned on. The controller task 46 receives the message 82, determines that the request is directed toward the controllable device 26-1, and, based on the controllable device structure 70, that the device command ON is an authorized device command for the controllable device 26-1.

The controller task 46 allocates a memory portion 84 to hold a response provided by the hypervisor 20 in response to an implement device command request from the controller task 46. The controller task 46 then inserts a pointer 86 in the EAX machine register that points to the memory portion 84. The controller task 46 then executes the following instruction string "UD2A:MagicNumber:IDCR(% EAX):D1:ON". Upon execution by the controller task 46 of the instruction string above, and because the UD2A opcode is an invalid opcode, control immediately transfers from the controller task 46 and the VM 22-1 to the hypervisor 20. The hypervisor 20 determines that an invalid opcode was encountered and examines the instruction string being executed. The hypervisor 20 identifies the MagicNumber (e.g., 0x107DEB1C) and determines, based on the MagicNumber, that the controller task 46 attempted to execute the invalid opcode UD2A, and thus that this is a communication from the controller task 46. The hypervisor 20 then accesses the instruction "IDCR(% EAX):D1:ON" and determines that this is an implement device command request that requests that the device command 30-1 (ON) be implemented on the controllable device 26-1. The hypervisor 20 accesses the authorized device command list 44-1 that contains the list of device commands that are authorized to be sent to the controllable device 26-1. The hypervisor 20 determines that the device command 30-1 is an authorized device command, and communicates a signal 92 to the controllable device 26-1 via the interface 28-1 to implement the device command 30-1. The hypervisor 20 may also receive an indication from the controllable device 26-1 that the device command 30-1 was successfully implemented. The hypervisor 20 may then access the pointer 86 in the EAX machine register, and insert an "ACK" message in the memory portion 84 to confirm that the controllable device 26-1 successfully implemented the device command 30-1. The hypervisor 20 then returns control to the controller task 46.

The controller task 46 may access the memory portion 84 and determine, based on the ACK message, that the device command 30-1 was successfully implemented. The controller task 46 may then publish, via the MQTT protocol to the remote server 48, a message confirming that the device command 30-1 was successfully implemented. The smart phone 52 may also have subscribed to the remote server 48 for messages provided by the controller task 46. The remote server 48 sends the confirmation message to the smart phone 52, which may then present information on a display that confirms to the user 50 that the light was successfully turned on.

Figure 7:
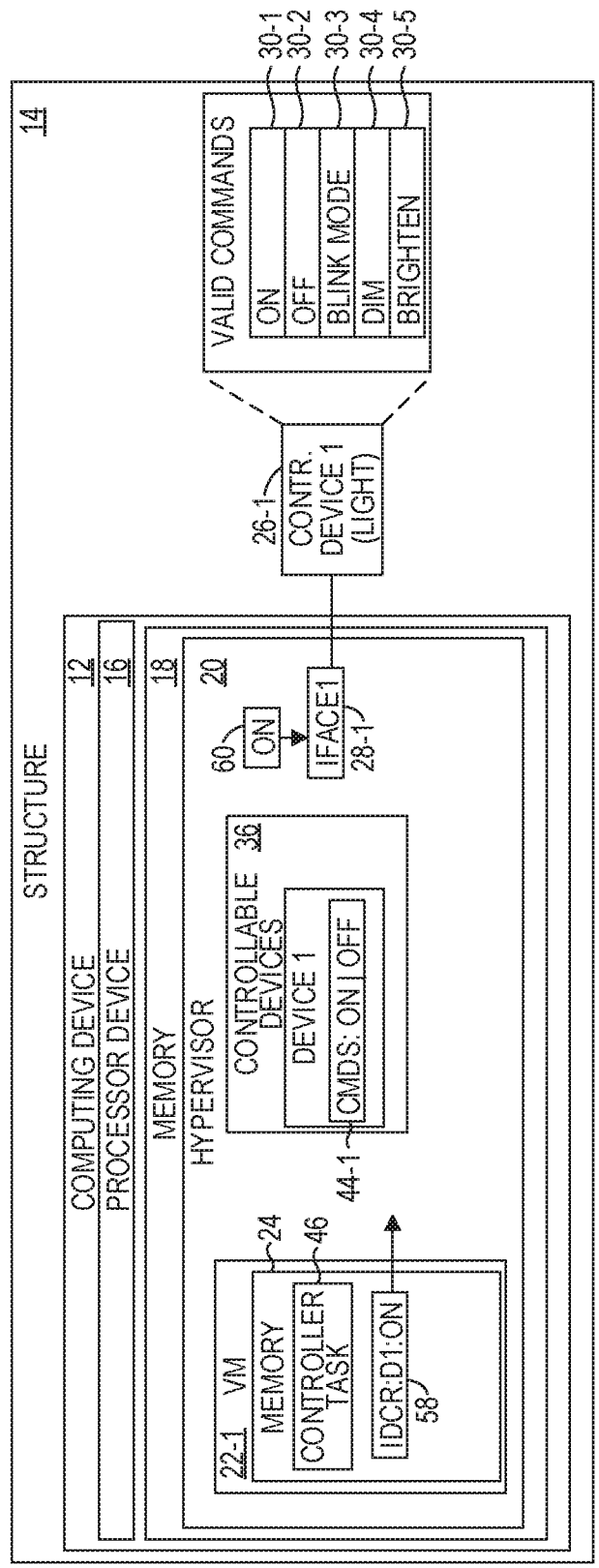
FIG. 7 is a simplified block diagram of an environment that is substantially similar to the environment illustrated in FIG. 1 according to one example.

FIG. 7 is a simplified block diagram of an environment 10-1 that is substantially similar to the environment 10 discussed above with regard to FIGS. 1-6, except as otherwise discussed herein. The environment 10-1 includes the computing device 12, which includes the interface 28-1, which is configured to communicate with the controllable device 26-1 communicatively connected to the computing device 12, and the processor device 16, which is coupled to the interface 28-1. The processor device 16 is to initiate the hypervisor 20. The processor device 16 is further to receive, by the hypervisor 20 from a task in the VM 22-1 that is controlled by the hypervisor 20, the implement device command request 58 that requests that the device command 30-1 be implemented on the controllable device 26-1 via the interface 28-1. The processor device 16 is further to determine, by the hypervisor 20, that the device command 30-1 is on the authorized device command list 44-1. The processor device 16 is further to, based on determining that the device command 30-1 is on the authorized device command list 44-1, communicate, by the hypervisor 20, the signal 60 to the controllable device 26-1 to implement the device command 30-1.

Figure 8:
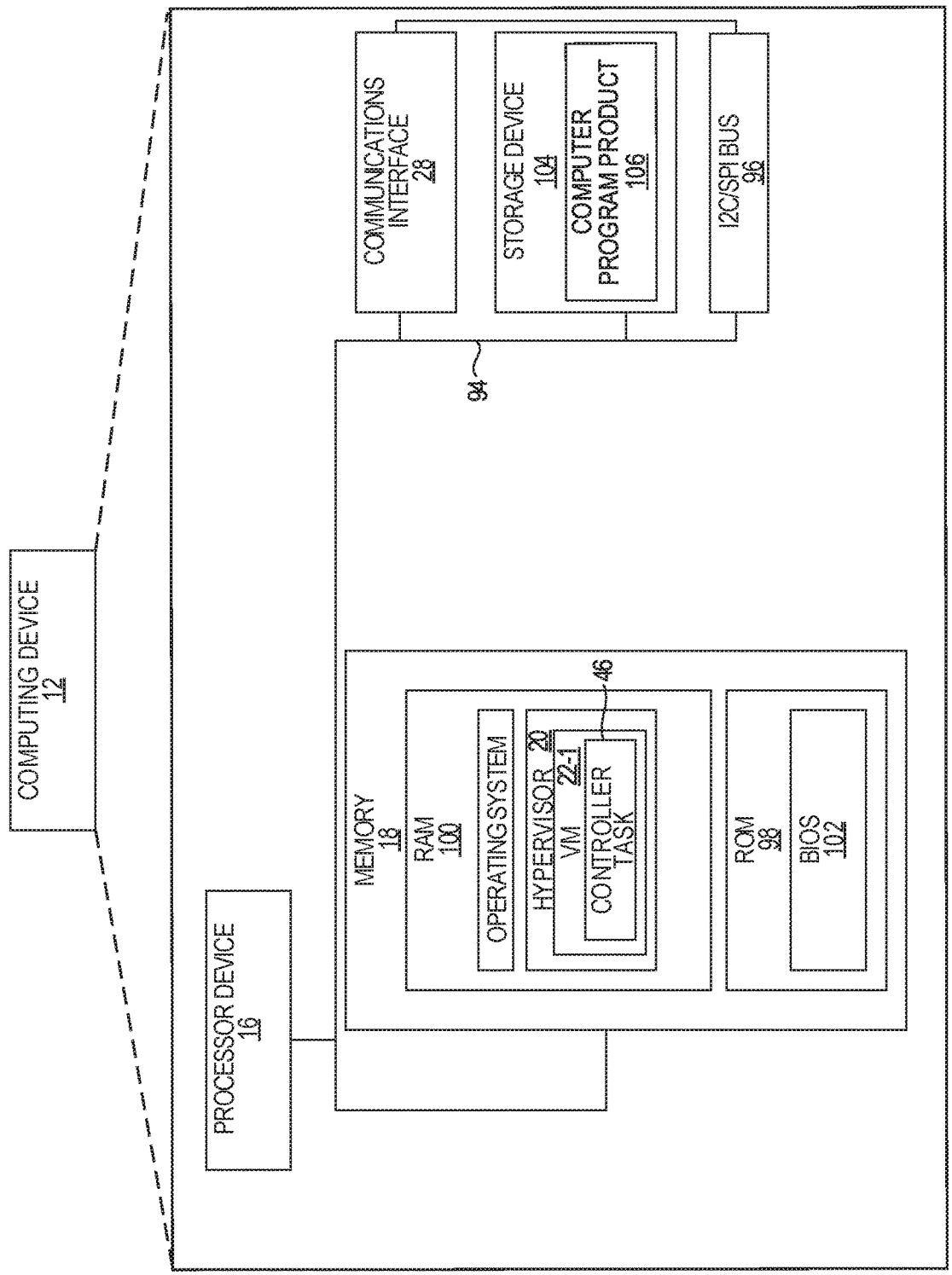
FIG. 8 is a block diagram of a computing device suitable for implementing examples disclosed herein.

FIG. 8 is a block diagram of the computing device 12 suitable for implementing examples according to one example. The computing device 12 may comprise any computing or electronic device capable of including firmware, hardware, and/or executing software instructions to implement the functionality described herein, such as a computer server, a desktop computing device, a laptop computing device, or may comprise a single board computer such as a Raspberry Pi. The computing device 12 includes the processor device 16, the memory 18, and a system bus 94. The system bus 94 provides an interface for system components including, but not limited to, the memory 18 and the processor device 16. The processor device 16 can be any commercially available or proprietary processor.

The system bus 94 may be any of several types of bus structures that may further interconnect to a memory bus (with or without a memory controller), a peripheral bus, and/or a local bus using any of a variety of commercially available bus architectures.

The computing device 12 may also include an I2C and/or SPI bus 96 to which one or more of the controllable devices 26-1-26-3 may be communicatively coupled.

The memory 18 may include non-volatile memory 98 (e.g., read-only memory (ROM), erasable programmable read-only memory (EPROM), electrically erasable programmable read-only memory (EEPROM), etc.), and volatile memory 100 (e.g., random-access memory (RAM)). A basic input/output system (BIOS) 102 may be stored in the non-volatile memory 98 and can include the basic routines that help to transfer information between elements within the computing device 12. The volatile memory 100 may also include a high-speed RAM, such as static RAM, for caching data.

The computing device 12 may further include or be coupled to a non-transitory computer-readable storage medium such as a storage device 104, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like.

A number of modules can be stored in the storage device 104 and in the volatile memory 100, including an operating system and one or more program modules, such as the hypervisor 20, the VM 22-1 and the controller task 46.

All or a portion of the examples may be implemented as a computer program product 106 stored on a transitory or non-transitory computer-usable or computer-readable storage medium, such as the storage device 104, which includes complex programming instructions, such as complex computer-readable program code, to cause the processor device 16 to carry out the steps described herein. Thus, the computer-readable program code can comprise software instructions for implementing the functionality of the examples described herein when executed on the processor device 16.

The computing device 12 may also include one or more interfaces 28 coupled to the system bus 94 and/or the 12C/SPI bus 96 for communicating to the controllable device 26-1-26-3.

Individuals will recognize improvements and modifications to the preferred examples of the disclosure. All such improvements and modifications are considered within the scope of the concepts disclosed herein and the claims that follow.

What is claimed is:

1. A method comprising:
receiving, by a hypervisor from a controller task in a virtual machine (VM) that is controlled by the hypervisor in a computing device on which the hypervisor executes, a first implement device command request that requests that a first device command be implemented on a controllable device communicatively connected to the computing device via an interface;
determining, by the hypervisor, that the first device command is on an authorized device command list;
based on determining that the first device command is on the authorized device command list, communicating, by the hypervisor via the interface, a signal to the controllable device to implement the first device command; and
publishing, by the controller task, via a Message Queuing Telemetry Transport (MQTT) protocol, a confirmation message confirming that the first device command was implemented on the controllable device.

2. The method of claim 1 further comprising initiating, in the VM, the controller task configured to receive a message from a task external to the VM that requests that the controllable device implement the first device command on the controllable device.

3. The method of claim 2 wherein the controllable device is configured to implement a plurality of device commands, and wherein the authorized device command list is a proper subset of the plurality of device commands.

4. The method of claim 3 further comprising receiving, by the hypervisor from the controller task, a list device command request that requests a list of device commands implementable on the controllable device.

5. The method of claim 4 wherein receiving, by the hypervisor from the controller task, the list device command request further comprises:
determining that the controller task attempted to execute an invalid opcode thereby causing control to transfer from the VM to the hypervisor;
accessing an instruction string associated with the invalid opcode; and
determining that the list device command request is identified in the instruction string.

6. The method of claim 5 further comprising:
copying the authorized device command list to a portion of memory at a memory location accessible to the VM; and
returning control to the controller task.

7. The method of claim 6 further comprising accessing a machine register to obtain a pointer to the memory location prior to copying the authorized device command list to the portion of memory accessible to the VM.

8. The method of claim 2 further comprising:
receiving, by the hypervisor from the controller task, a list device request that requests a list of controllable devices; and
in response to the list device request, providing, by the hypervisor to the controller task, a device identifier that identifies the controllable device.

9. The method of claim 8 further comprising:
identifying, by the hypervisor, a plurality of controllable devices communicatively connected to the computing device via the interface or other interfaces, each controllable device configured to implement a corresponding plurality of device commands, the hypervisor maintaining, for each controllable device, a respective list of authorized commands that the controllable device is configured to implement; and
in response to the list device request, providing, by the hypervisor to the controller task, a plurality of device identifiers, each device identifier corresponding to a different one of the plurality of controllable devices.

10. The method of claim 2 further comprising:
receiving, by the controller task, the message originated by the task external to the VM, the message requesting that the first device command be implemented; and
in response to the message, communicating the first implement device command request that identifies the first device command to the hypervisor.

11. The method of claim 10 further comprising:
receiving, by the controller task, via the MQTT protocol, the message originated by the task external to the VM.

12. The method of claim 1 wherein the controllable device comprises one of a sensor configured to sense an attribute of an environment, an actuator, a servo motor, or an amplifier.

13. The method of claim 1 wherein the interface comprises one of an I2C interface or a Serial Peripheral Interface (SPI) interface.

14. The method of claim 1 wherein receiving, by the hypervisor from the controller task, the first implement device command request further comprises:
determining that the controller task attempted to execute an invalid opcode thereby causing control to transfer from the VM to the hypervisor;
accessing an instruction string associated with the invalid opcode; and
determining that the first implement device command request and the first device command are identified in the instruction string.

15. The method of claim 1 further comprising:
receiving, by the hypervisor from the controller task, a second implement device command request that requests that a second device command be implemented on the controllable device;
determining that the second device command is not identified on the authorized device command list; and
based on determining that the second device command is not identified on the authorized device command list, disregarding the second implement device command request.

16. A computing device, comprising:
an interface configured to communicate with a controllable device communicatively connected to the computing device;
a processor device coupled to the interface to:
initiate a hypervisor;
receive, by the hypervisor from a controller task in a virtual machine (VM) that is controlled by the hypervisor, an implement device command request that requests that a device command be implemented on the controllable device;
determine, by the hypervisor, that the first device command is on an authorized device command list;
based on determining that the device command is on the authorized device command list, communicate, by the hypervisor via the interface, a signal to the controllable device to implement the device command; and
publish, by the controller task, via a Message Queuing Telemetry Transport (MQTT) protocol, a confirmation message confirming that the device command was implemented on the controllable device.

17. A computer program product stored on a non-transitory computer-readable storage medium and including instructions configured to cause a processor device to:
- receive, by a hypervisor from a controller task in a virtual machine (VM) that is controlled by the hypervisor in a computing device on which the hypervisor executes, an implement device command request that requests that a device command be implemented on a controllable device communicatively connected to the computing device via an interface;
- determine, by the hypervisor, that the device command is on an authorized device command list;
- based on determining that the device command is on the authorized device command list, communicate, by the hypervisor via the interface, a signal to the controllable device to implement the device command; and
- publish, by the controller task, via a Message Queuing Telemetry Transport (MQTT) protocol, a confirmation message confirming that the device command was implemented on the controllable device.

* * * * *